Sept. 9, 1958   A. J. KINDIG   2,851,140
CONVEYER ROLL SHELL ASSEMBLY AND METHOD OF MAKING IT
Filed March 15, 1954   2 Sheets-Sheet 1
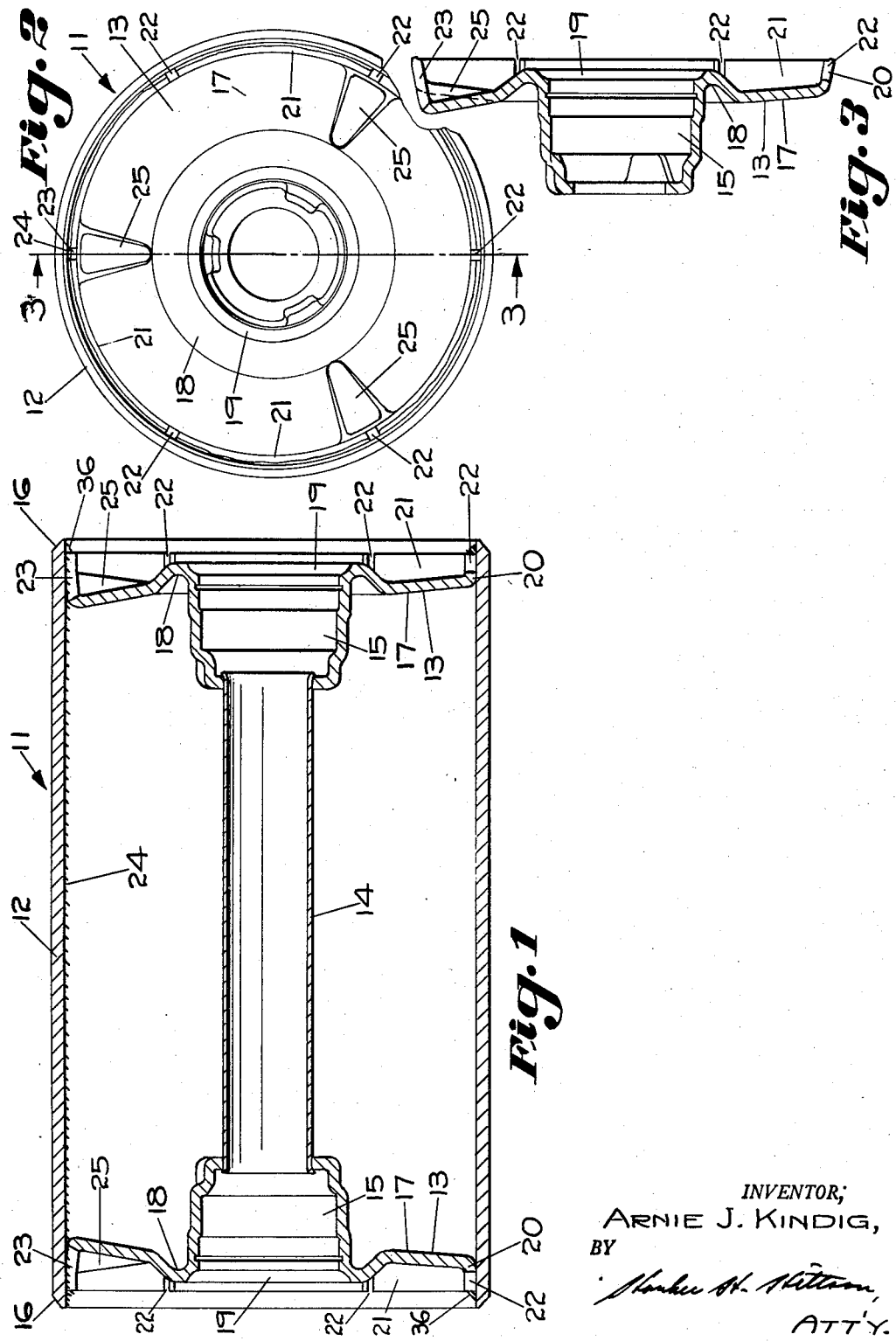
INVENTOR:
ARNIE J. KINDIG,
BY
ATT'Y.

Sept. 9, 1958                    A. J. KINDIG                    2,851,140
CONVEYER ROLL SHELL ASSEMBLY AND METHOD OF MAKING IT
Filed March 15, 1954                                    2 Sheets-Sheet 2
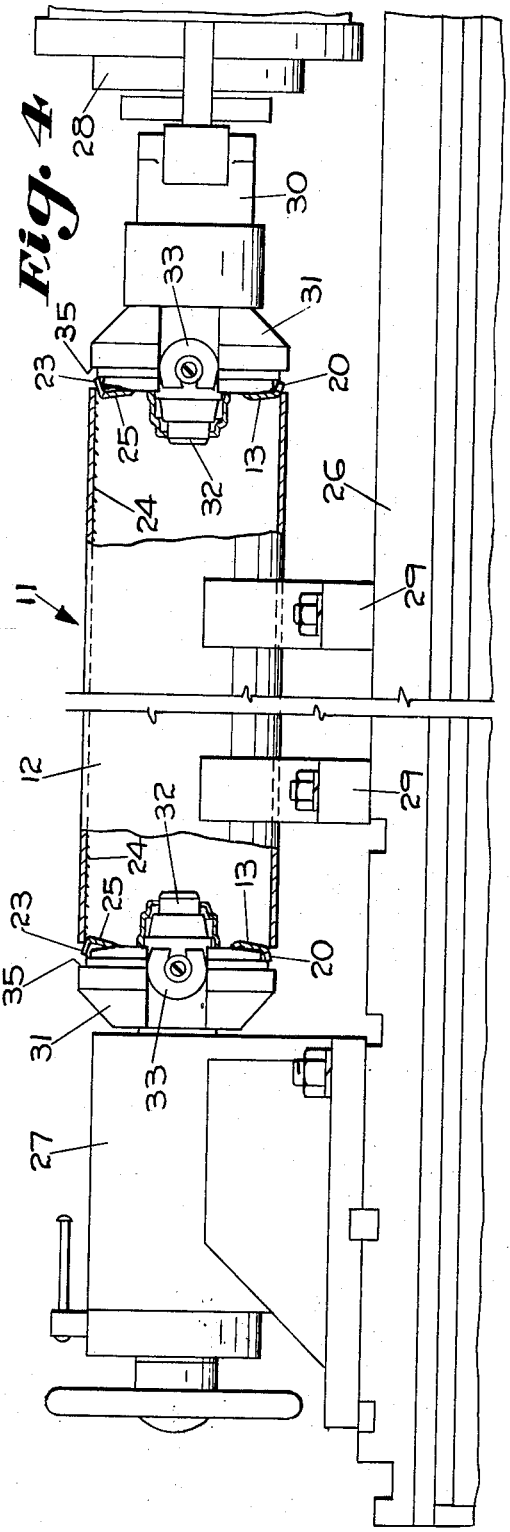
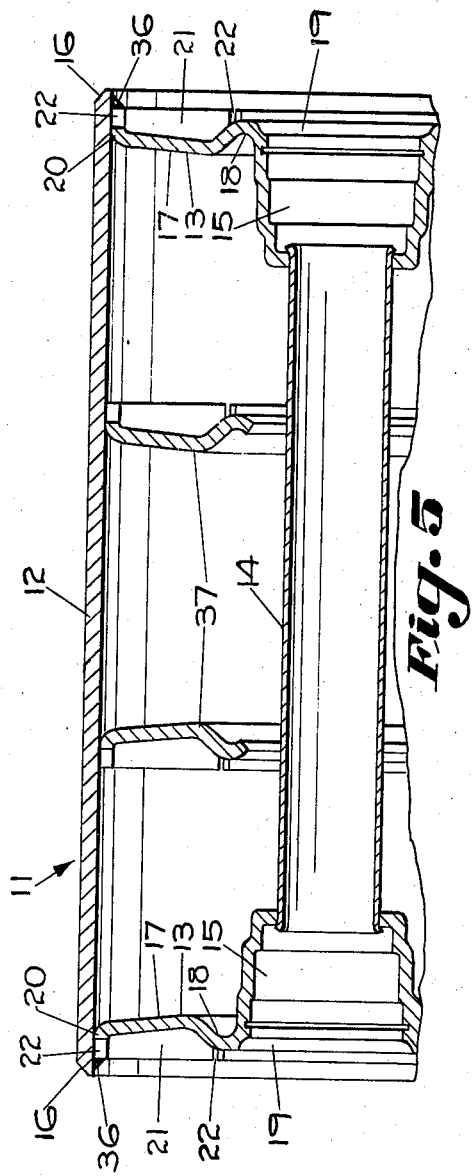
INVENTOR:
ARNIE J. KINDIG,
BY
ATT'Y.

United States Patent Office 2,851,140
Patented Sept. 9, 1958

2,851,140

CONVEYER ROLL SHELL ASSEMBLY AND METHOD OF MAKING IT

Arnie J. Kindig, Columbus, Ohio, assignor to The Jeffrey Manufacturing Company, a corporation of Ohio Application March 15, 1954, Serial No. 416,062

7 Claims. (Cl. 193—37)

This invention relates to conveyer roll shell assemblies of the type such as are used in conveyer rolls and the like as well as the method of making the roll shell assemblies.

One object of the invention is to provide an improved conveyer roll shell assembly that may be made from stock tubing, the internal diameter of which may vary from piece to piece of the tubing, or which may vary in the same piece of tubing.

Another object of the invention is to provide an improved conveyer roll shell assembly that includes a hollow shell and an end bell, disk or the like that is pressed into it, said end bell including deformable means at its periphery capable of being compressed or bent in a radial direction whereby said end bell may be pressed into said shell with a tight fit, said end bell tending, if necessary, to impart a desired contour or shape to said shell.

Another object of the invention is to provide improved methods of making the conveyer roll shell assemblies set forth in the preceding objects.

Still another object of the invention is to provide an improved end bell, disk or the like per se which is preferably, but not necessarily, a die stamping and which may be pressed into a roll shell as set forth above.

Other objects of the invention will appear hereinafter, the novel features and combinations being set forth in the appended claims.

In the accompanying drawings:

Fig. 1 is a view in section, with a portion broken away, showing a roll shell assembly including the features of the invention;

Fig. 2 is an end view of the roll shell assembly seen in Fig. 1;

Fig. 3 is a view in section taken through one of the end bells of the roll assembly seen in Figs. 1 and 2, the view being taken on line 3—3 of Fig. 2, but showing the end bell before it is pressed into a roll shell;

Fig. 4 is a view showing elements of a conveyer roll shell as they appear when in a machine that forces the end bells into the shell; and Fig. 5 is a view in section of a modified roll shell assembly including features of the invention.

The roll shell assembly 11 shown in Figs. 1 and 2 of the drawings includes a tubular shell 12 closed at each of its ends by an end bell, disk or plate 13 and including a central tube 14. The shell assembly 11 is carried at each of its opposite ends through its end disks 13 on antifriction roller bearings received in central cups or hubs 15 of the end bells, disks or plates 13 and mounted upon a hollow dead shaft, not shown, that extends longitudinally or axially through the center tube 14 of the shell assembly 11 and on the longitudinal axis of the latter. The center tube 14 extends through axially aligned central openings in the cups or hubs 15 and is swedged and flanged therein as seen in Fig. 1 of the drawings.

The above mentioned bearings and shaft for carrying the shell assembly together with means for adjusting the bearings are disclosed fully in my Patent No. 2,702,868, issued February 22, 1955, for a Conveyer Roller Assembly.

The invention herein claimed resides in the features and structure of the shell assembly 11 including the shell 12 and end bells, disks or plates 13 as well as the method of making the assemblies. Engineers working in this art have long been striving to devise a shell assembly, such as shell assembly 11, together with a method of making it whereby the shell assembly may be mass produced successfully from die stampings and stock sizes of tubing of either the welded or seamless type. It is well known that the diametrical dimensions, both inside and outside, of these types of tubing may vary from piece to piece, or even in the same piece, and this fact has heretofore made it necessary to bore or otherwise finish the inside surface of these types of tubes or shells substantially, for example, to perfect cylinders of definite diameters, particularly adjacent their ends, in order that they may receive end bells having definite outside dimensions. Then, too, there has always been another problem connected with the manufacture of roll assemblies including shells made from stock tubing because such tubing is not always cylindrical. This, of course, adds complications to the above described problem of boring or finishing the inside walls of the shells or tubes and inserting end bells in them because it makes it necessary to shape the shells or tubes in some manner, substantially, for example, into a true cylinder prior to its being bored or finished internally, as aforesaid, and prior to or while end bells are being pressed in them.

The shell assembly 11 and the method herein disclosed for making it overcomes these problems entirely. The shell assembly 11 is readily mass producible because its end bells, disks or plates 13 are designed in such manner that they may be pressed, somewhat in the manner of a milk bottle cap, into the end of a shell 12 which is made from a length of welded or seamless stock type tubing without boring or otherwise finishing the inside of said shell and when said end bells, disks or plates 13 are so pressed into the opposite ends of a shell or tube 12 they shape it substantially to the peripheral shape of the end bell.

Shell 12 of the roll assembly 11 shown in the drawings is made from a piece of stock size welded tubing which has been cut to the desired length and had its outer peripheral edges chamfered as indicated at 16. Where low cost is a major consideration, low cost welded tubing may be used as compared to the more expensive seamless tubing.

More specifically, the end bell or disk 13 (see Fig. 3) is a one-piece generally circular die stamping formed from a single piece of sheet stock and it includes a disk or ring-like body portion 17 in the form of a frustum of a cone that surrounds the central cylindrical cup or hub 15. Cup or hub 15 is a multiple stepped tubular cylinder that is drawn or pressed from the center of the end bell or disk 13 and is symmetrical about the axis of rotation of the shell assembly 11. The open mouth or cup 15 and the small diameter end of the body portion 17 are faired together through a reverse curve formed by a circular bead 18 that is coined to provide a concave wiping surface 19 that surrounds the mouth of cup 15 and against which a peripheral edge portion of the flexible diaphragm, not shown, of a seal for the bearing rides. As seen in the drawings, the disk or ring-like body portion 17 slopes radially outwardly from its small or inside diameter end to its large or outside diameter end and, generally, from the base or bottom of cup 15 toward its open mouth.

The large diameter end or periphery of the body portion 17 is surrounded by a lip or flange 20 that is bent or pressed from the material of the end bell or disk 13 through an angle of less than 90°, that is, the lip or flange 20, if continuous, would be a frustum of a cone that slopes toward the base or bottom of the cup or hub 15 and has its small diameter end attached or connected to the large diameter end or periphery of the body portion 17. The lip or flange 20 is divided into a plurality of integral segments 21 by a series of radially spaced slots 22 that extend from the free edge of the lip or flange 20 toward the body portion 17 of the end bell 13.

The end bell 13 shown in the drawings is for a shell 12 having an outside diameter of about 6 inches and it is provided with six of the slots 22. The number of slots 22 in an end bell or disk may be changed when the end bell or disk is to be used with a shell of larger or smaller diameter in order to maintain the chord length of each segment 21 of the lip or flange 20 such that the end bell 13 may be pressed into a shell without detriment to the end bell and with benefit to the shell.

One of the slots 22 is deeper than the others and it extends into the body portion 17 of the end bell 13, as indicated at 23, to provide a groove for receiving the flash or weld bead 24 on the inside of a shell 12 when the end bell 13 is pressed thereinto. This slot 23 also has the important function in the shell assembly 11 shown in the drawings of providing a breather opening in the shell assembly 11 through which air may pass to maintain the air pressure within the shell assembly 11 equal to the ambient air pressure.

The body portion 17 of the end bell or disk 13 has embossed in it or pressed from it a plurality of triangular shaped stiffening means in the form of beads, bumps or ribs 25 which stiffen the body portion 17 between the bead 18 and the lip or flange 20 thereby to prevent flexing or "oil canning" of the end bell or disk 13 as the shell assembly 11 rotates upon a shaft. The stiffening ribs 25 are radially spaced and aligned with alternate slots 22.

The outside diameter of the body portion 17 of the end bell 13, and consequently, the minor diameter of the lip or flange 20, is slightly less than the minimum inside diameter of any shell 12 into which the end bell 13 may be inserted and the flange 20, or segments 21 of which it is formed, slopes radially outwardly from the body portion 17 to its maximum diameter, which is slightly larger than the maximum inside diameter of any shell 12 into which the end bell or disk 13 may be pressed.

The shell 12 and end bells 13 may be assembled on the machine shown diagrammatically in Fig. 4 of the drawings. This machine includes a bed 26 upon which there is mounted a tail stock 27, a head stock 28 and a pair of spaced cradles 29, all of which may be adjusted longitudinally along the bed 26 to accommodate the machine to shells 12 of different lengths. Head stock 28 includes a hydraulic ram or jack, the piston rod 30 of which carries an arbor 31 having a central stub or pilot 32 and three permanent magnets 33. The tail stock 27 also carries an arbor which is identical to arbor 31 and the arbors of the head and tail stocks 28 and 27, respectively, are axially aligned.

When a shell 12 is to have end bells 13 pressed into it a pair of end bells 13 are mounted, one on each arbor 31, and the shell 12 is placed in the cradle 29 which substantially aligns it axially with the arbors 31 and end bells 13. The hydraulic ram or jack may then be operated to move the end bell 13 which it carries toward the shell 12 and to move the shell 12 toward the end bell 13 carried on the arbor 31 of tail stock 27. The lips or flanges 20 of the end bells 13, because they are frustums, will then cause the shell 12 to become axially aligned substantially exactly with the end bells 13 and, upon continued motion of the piston rod 30, the end bells 13 will be forced into the ends of the shell 12.

The central stub or pilot 32 of each arbor 31 fits through the central opening in the bottom of the cup or hub 15 of the end bell 13 placed thereon and the arbor includes a face that engages the body portion 17 of the end bell. The three magnets 33 hold the end bell 13 upon the arbor 31 and the arbor is provided with an abutment 35 which lies radially outwardly of the lip or flange 20 of end bell 13. The abutment 35 limits the depth to which the arbor may place the end bell 13 into the shell 12 by engaging the end of the shell 12 when the end bell has been forced the proper distance into the shell 12.

It will be seen that because the flange 20, or segments 21 thereof, of each end bell or disk 13 is in the shape of a frustum of a cone the major diameter of which is greater than, and the minor diameter of which is less than, the inside diameter of shell 12, when the end bell or disk 13 is forced, with its minor diameter first, into the end of a shell 12 the flanges 20, or the segments 21 thereof, will be deformed generally radially inwardly by the shell 12 and, also, should the shell 12 be slightly misshaped, or out of round for example, this forcing of the end bell or disk 13 into it will cause the flange 20, or the segments 21 that form it, to shape the shell 12, that is, the flange 20 will impart its peripheral shape to the shell 12. The end bell 13, of course, fits tightly within the shell 12 and the flanges thereof exert a radially outward pressure upon the shell. The segments 21 of the end bells or disks 13 are preferably welded to the shell 12, as indicated at 36, to connect permanently the end bells 13 and the shell 12.

When the length of any shell 12 is such that it cannot be shaped properly throughout its entire length by end bells 13 only, one or more disks or plates 37 similar to the end bells 13, but without a cup or hub portion, may be pressed into said shell and spaced axially with respect to the end bells 13 and/or with respect to each other, as indicated in Fig. 5 of the drawings, to cause the shell 12 to become substantially cylindrical throughout its full length.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. The method of making a roll assembly having a tubular shell and an end bell, comprising the steps of forming an end bell with a body and a peripheral frusto-conical portion having a major diameter which is substantially greater than the inside diameter of the shell, slotting said frusto-conical portion to provide a plurality of individual segments so that the end bell may be pressed into the shell without detriment to the end bell, pressing portions of the body of said end bell to form a plurality of triangular shaped stiffening means to prevent flexing of the end bell, pressing said end bell into an open end of the shell and reducing substantially the major diameter of the end bell and simultaneously imparting the peripheral shape of the end bell to the shell.

2. The method of making a roll assembly having a tubular shell and an end bell, comprising the steps of forming an end bell with a body and a peripheral frusto-conical portion having a major diameter which is substantially greater than and a minor diameter which is substantially less than the inside diameter of the shell, slotting said frusto-conical portion to provide a plurality of individual segments so that the end bell may be pressed into the shell without detriment to the end bell, pressing portions of the body of said end bell to form a plurality of triangular shaped stiffening means to prevent flexing of the end bell, pressing said end bell into an open end of the shell and reducing substantially the major diameter of the end bell and simultaneously imparting the peripheral shape of the end bell to the shell.

3. The method of making a roll assembly having a tubular shell and an end bell, comprising the steps of forming an end bell with a body and a peripheral frusto-conical portion having a major diameter which is substantially greater than the inside diameter of the shell, forming a plurality of individual segments in the frusto-conical portion so that the end bell may be pressed into the shell without detriment to the end bell, pressing portions of the body of said end bell to form a plurality of triangular shaped stiffening means to prevent flexing of the end bell, pressing said end bell into an open end of the shell and reducing substantially the major diameter of the end bell and simultaneously imparting the peripheral shape of the end bell to the shell.

4. The method of making a roll assembly having a tubular shell and an end bell, comprising the steps of forming an end bell with a body and a peripheral frusto-conical portion having a major diameter which is substantially greater than the inside diameter of the shell, forming a plurality of individual segments in the frusto-conical portion so that the end bell may be pressed into the shell without detriment to the end bell, forming the body of said end bell with a plurality of stiffening sections to prevent flexing of the end bell, pressing said end bell into an open end of the shell and reducing substantially the major diameter of the end bell and simultaneously imparting the peripheral shape of the end bell to the shell.

5. The method of making a roll assembly having a tubular shell and an end bell, comprising the steps of forming an end bell with a body and a peripheral frusto-conical portion having a major diameter which is substantially greater than the inside diameter of the shell, slotting said frusto-conical portion to provide a plurality of individual segments so that the end bell may be pressed into the shell without detriment to the end bell, forming the body of said end bell with at least one stiffening section to prevent flexing of the end bell, pressing said end bell into an open end of the shell and reducing substantially the major diameter of the end bell and simultaneously imparting the peripheral shape of the end bell to the shell.

6. An end bell adapted to be fitted into the open end of a tubular shell to form a roll assembly comprising, a body with a peripheral frusto-conical flange portion having a major diameter which is substantially greater than the inside diameter of the tubular shell, slots dividing said peripheral frusto-conical flange portion into a plurality of individual segments to permit the end bell to be fitted into the tubular shell to close and end thereof with said individual segments bearing against the inside wall of the tubular shell, and a plurality of triangular shaped indentations in the body portion to stiffen the body portion and prevent flexing of the end bell.

7. An end bell adapted to be fitted into the open end of a tubular shell to form a roll assembly comprising, a body with a peripheral frusto-conical flange portion having a major diameter which is substantially greater than the inside diameter of the tubular shell, slots dividing said peripheral frusto-conical flange portion into a plurality of individual segments to permit the end bell to be fitted into the tubular shell to close an end thereof with said individual segments bearing against the inside wall of the tubular shell, and reinforcing means to stiffen the body portion and prevent flexing of the end bell.

References Cited in the file of this patent

UNITED STATES PATENTS

| | | |
|---|---|---|
| 1,141,515 | Alvey | June 1, 1915 |
| 1,648,626 | Smith | Nov. 8, 1927 |
| 1,980,364 | Thomas | Nov. 13, 1934 |
| 2,049,228 | Sebell | July 28, 1936 |
| 2,079,790 | Colorigh | May 11, 1937 |
| 2,218,817 | Frost | Oct. 22, 1940 |
| 2,286,152 | Miller | June 9, 1942 |
| 2,464,017 | Berghorn | Mar. 8, 1949 |
| 2,593,069 | Steinmetz | Apr. 15, 1952 |
| 2,607,459 | Ludwig et al. | Aug. 19, 1952 |
| 2,636,640 | Bedford | Apr. 28, 1953 |
| 2,737,205 | Stringfield | Mar. 6, 1956 |

FOREIGN PATENTS

| | | |
|---|---|---|
| 3,338 | Great Britain | June 25, 1908 |
| 306,466 | Great Britain | Feb. 18, 1929 |